(12) United States Patent
Feller

(10) Patent No.: US 6,457,371 B1
(45) Date of Patent: *Oct. 1, 2002

(54) ULTRASONIC FLOW SENSOR WITH ERROR DETECTION AND COMPENSATION

(76) Inventor: Murray F. Feller, 21577 NW. 75th Avenue Rd., Micanopy, FL (US) 32667

( * ) Notice: Subject to any disclaimer, the term of this patent is extended or adjusted under 35 U.S.C. 154(b) by 0 days.

This patent is subject to a terminal disclaimer.

(21) Appl. No.: 09/971,438

(22) Filed: Oct. 5, 2001

Related U.S. Application Data

(63) Continuation-in-part of application No. 09/592,313, filed on Jun. 13, 2000.

(51) Int. Cl.[7] .................................................. G01F 1/66
(52) U.S. Cl. .................................. 73/861.29; 73/861.27
(58) Field of Search ........................ 73/861.29, 861.27, 73/861.31, 861.28, 861.18, 861.25

(56) References Cited

U.S. PATENT DOCUMENTS 4,221,128 A * 9/1980 Lawson et al. .......... 73/170.13

* cited by examiner

Primary Examiner—Benjamin R. Fuller
Assistant Examiner—Corey D. Mack
(74) Attorney, Agent, or Firm—David Kiewit

(57) ABSTRACT

An ultrasonic transit time flow sensor detects a signal corresponding to the phase difference between signals from two transducers during the interval of an acoustic transmission, and uses this signal to adjust an output flow rate signal in order to compensate for circuit errors inherent in the flow sensor. An Exclusive-Or phase detector detects the difference in phase between the signals resulting from the difference in propagation transit time of the flowing fluid. This measured difference includes a phase shift due to the electrical circuits of the flow sensor. In order to compensate for the circuit-induced phase shift, when the transducers are transmitting bursts of acoustic energy, the corresponding electrical signals are routed to the Exclusive-Or phase detector in order to generate a common mode DC signal representative only of the phase shift of the electrical circuits of the flow sensor.

14 Claims, 3 Drawing Sheets

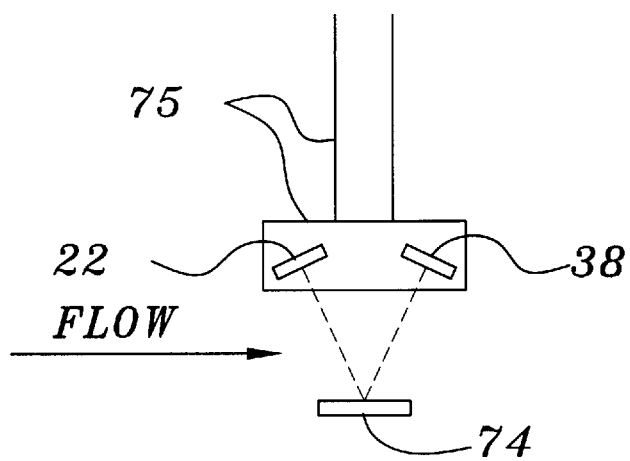
FIG. 2a
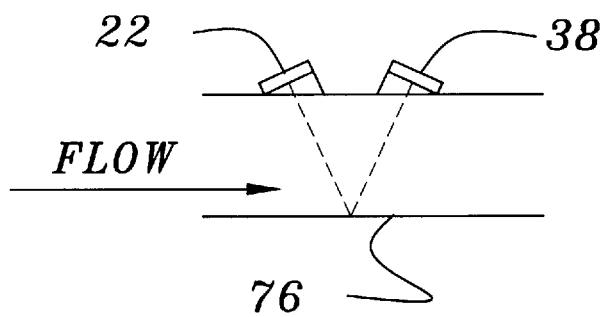
FIG. 2b
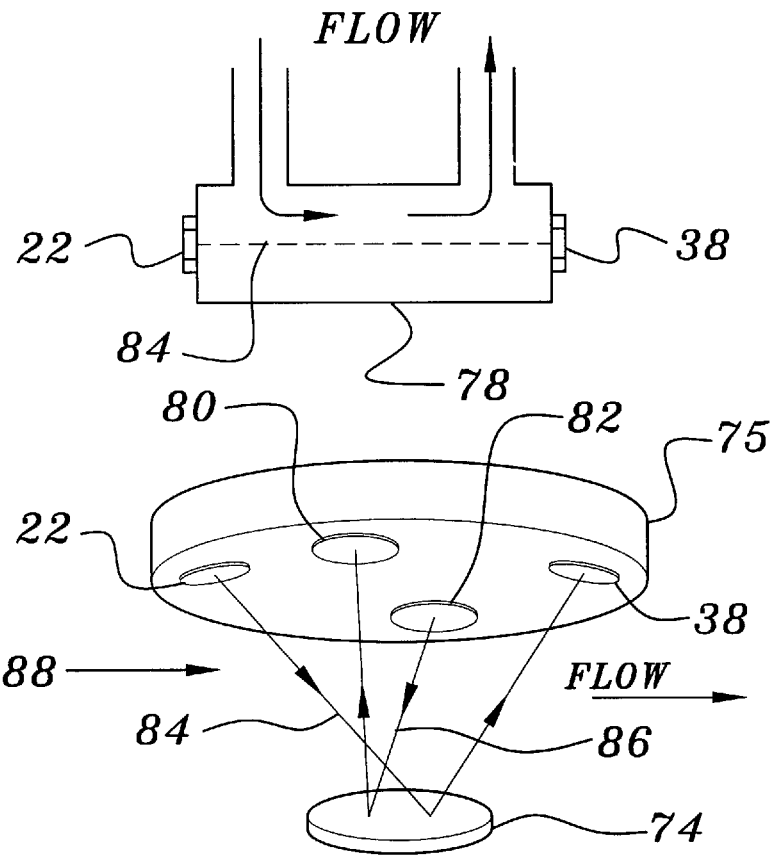
FIG. 2c
FIG. 2d

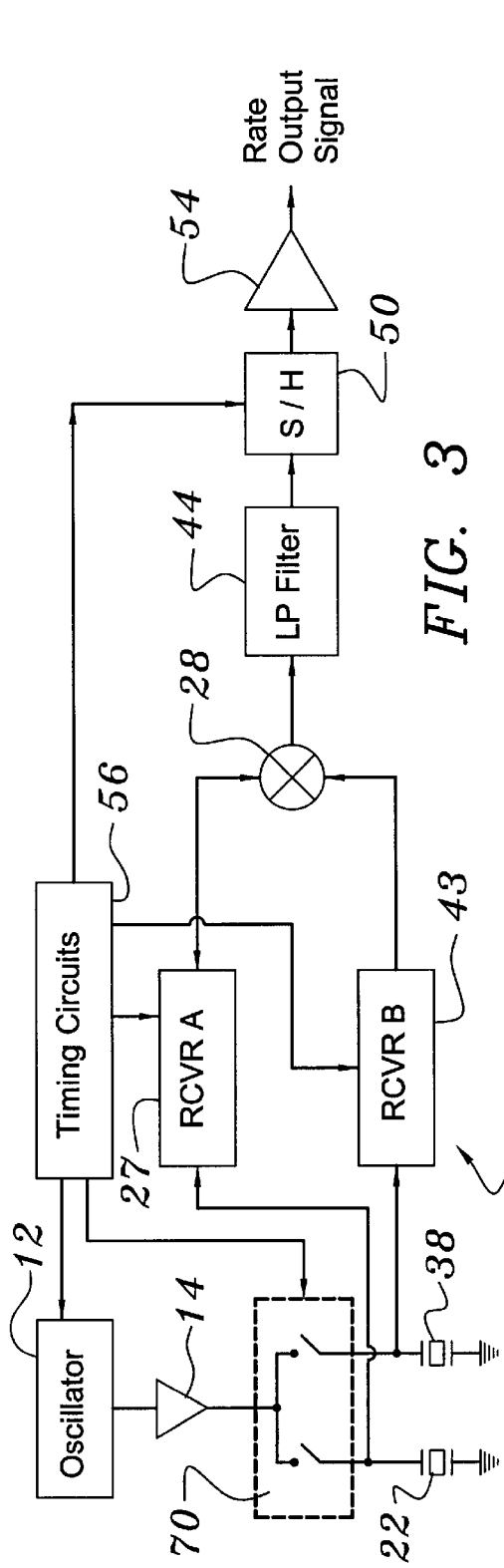
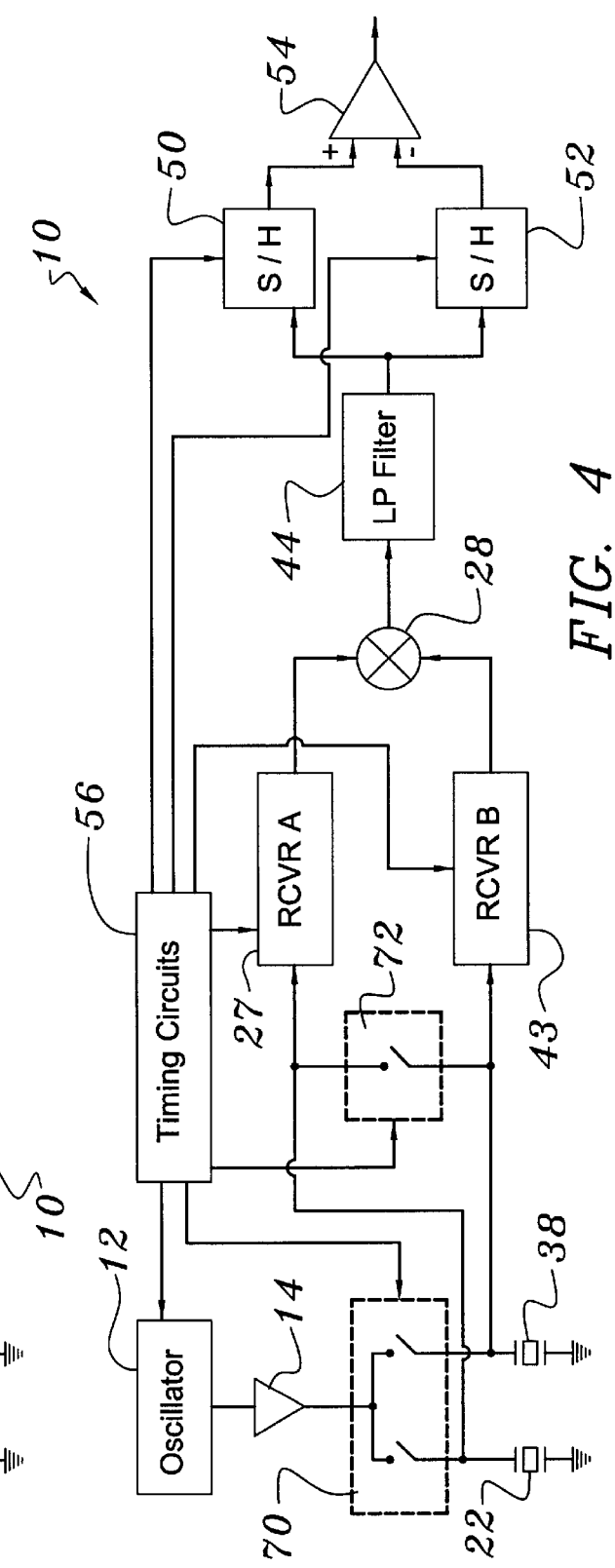
FIG. 3
FIG. 4

ULTRASONIC FLOW SENSOR WITH ERROR DETECTION AND COMPENSATION

CROSS REFERENCE TO RELATED APPLICATIONS

This application is a Continuation-in-Part of Applicant's U.S. Application Ser. No. 09/592,313, filed Jun. 13, 2000.

BACKGROUND OF THE INVENTION

1. Field of the Invention

This invention relates to apparatus and method for measuring the flow rate of a fluid in which the propagation times of ultrasonic signals transmitted through the fluid are detected to determine flow rate. The invention further relates to improving the precision of measurement, improving flow sensor stability, and reducing power consumption, complexity and cost.

2. Background Information

Ultrasonic transit time flow sensors, also known as time of flight ultrasonic flow sensors, detect the acoustic propagation time difference between the upstream and downstream ultrasonic transmissions resulting from the movement of a flowing fluid, which may be a liquid or a gas, and process this information to derive a fluid flow rate. One method used by these sensors and described in the U.S. Pat. No. 4,221,128 to Lawson et al, is to transmit a burst of continuous waves concurrently from upstream and downstream transducers. The difference in time between the reception of those signals is a measure of flow rate. Lawson et al use a frequency translation means to convert the received frequencies down to a relatively low frequency for detecting the time difference, an approach which requires some elaboration in electronic circuitry. Furthermore, Lawson et al. do not incorporate error detecting means to compensate for the drift of components that is expected to occur over a period of time or temperature range, and rely instead on costly high stability components.

It is therefore an object of the present invention to incorporate an error detecting means to compensate for component errors, as well as acoustic path related errors, thereby enabling lower cost components and simpler circuits to be used.

BRIEF SUMMARY OF THE INVENTION

The present invention satisfies the above and other objects by providing an ultrasonic, transit-time flow sensor in accordance with preferred embodiments of the present invention. The sensor, in a first instance, generally operates to detect a signal corresponding to the phase difference between signals from two transducers during the interval of an acoustic transmission, and using this signal to adjust an output flow rate signal to compensate for circuit error inherent in the flow sensor.

In one of the preferred embodiments of the flow sensor, a burst of an acoustic signal is transmitted from a first transducer located upstream of a second transducer. After a period of time greater than that of the acoustic burst signal duration, the signal is received by the second transducer located downstream of the first transducer. Concurrently with the transmission of the first transducer, the second transducer similarly transmits a burst of acoustic energy which is received by the first transducer. Although the transmitted signals are of the same frequency, they are 90 degrees out of phase.

Each transducer has its own receiver. During the transmitted bursts of acoustic energy, the corresponding electrical signals are also routed from the transducers to the two receivers and also an Exclusive-Or phase detector. The output from the phase detector is filtered, sampled and stored to become a common mode DC signal representative only of the phase shift of the electrical circuits of the flow sensor.

At the time when the transmitted acoustic signals are expected to be received by the transducers, the transducer signals are again routed into the receivers. The Exclusive-Or phase detector detects the difference in phase between the signals resulting from the difference in propagation transit time of the flowing fluid, in addition to the phase shift due to the electrical circuits of the flow sensor. The phase detector signal is again filtered, and sampled but separately stored. This stored signal is combined with the previously stored signal in a differential amplifier. This allows errors such as phase drift due to the electrical circuits to be canceled. With amplification, this signal becomes the basic output flow rate signal.

Both transducer transmissions occur at the same time and the received signals are phase compared against each other, or alternately, to a common reference signal. Since the received signals are also received at the same time at zero flow rate, the flow sensing errors due to variances in the propagation of the acoustic energy are minimal. However, in another embodiment of the present invention, transmissions and receptions can occur alternately if desired, whereby each reception can, for example, be phase compared against a common reference signal. In a further embodiment, both transducers and phase detector are responsive to the transducer signals produced by the acoustic transmissions which are reflected back to the originating transducer to produce a common mode correction. Further embodiments comprise an operational configuration where the transmitted signals are in phase.

Although it is believed that the foregoing recital of features and advantages may be of use to one who is skilled in the art and who wishes to learn how to practice the invention, it will be recognized that the foregoing recital is not intended to list all of the features and advantages. Moreover, it may be noted that various embodiments of the invention may provide various combinations of the hereinbefore recited features and advantages of the invention, and that less than all of the recited features and advantages may be provided by some embodiments.

BRIEF DESCRIPTION OF THE SEVERAL VIEWS OF THE DRAWING

The various advantages of the present invention will become apparent to one skilled in the art by reading the following specification and subjoined claims and by referencing the following drawings in which:

FIGS. 2a–2d provide schematic depictions of various preferred implementation of the present invention.

FIG. 3 is a schematic circuit block diagram of a second preferred embodiment of the invention.

FIG. 4 is a schematic circuit block diagram of a third preferred embodiment of the invention.

DETAILED DESCRIPTION OF THE INVENTION

Figure 1:
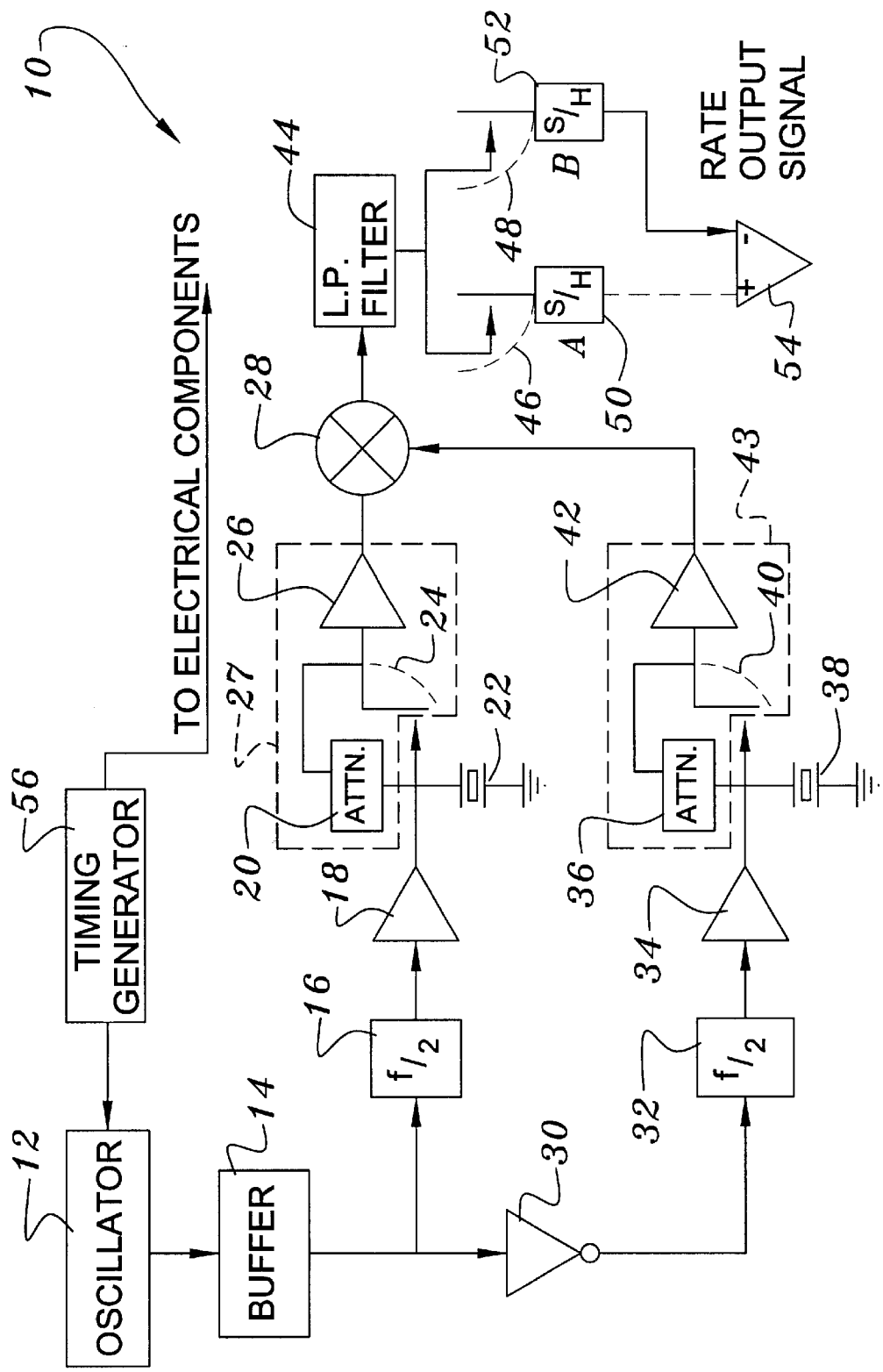
FIG. 1 is a schematic circuit block diagram of a preferred embodiment of the invention.

Turning now to FIG. 1, one finds a schematic depiction of a flow sensor 10 in accordance with a preferred embodiment of the present invention. An oscillator 12 produces bursts of continuous high frequency waves which are isolated by a buffer 14, and enter a first frequency divider 16 and an inverter 30. The output signal from a frequency divider 16 enters a first drive amplifier 18 which powers a first transducer 22 and a first attenuator 20. The attenuator 20 is preferably arranged so that it can be switched in or out of operation by a first switch 24. Ie direct (i.e., unattenuated) or attenuated signal from the first transducer 22 is amplified by a first receiving amplifier 26 and enters a phase detector 28. Components 20, 24 and 26 form a first receiving circuit 27. The output signal from the inverter 30 is similarly frequency divided by a second divider 32 and amplified by a second drive amplifier 34 which powers a second transducer 38. The output of the second transducer 38 is coupled to an input of a second receiver amplifier 42 via a switch 40. A second attenuator 36 can be switched in or out of operation by the second switch 40. The direct (i.e., unattenuated) or attenuated signal from transducer 38 is amplified in the second receiver amplifier 42 before entering phase detector 28. Components 36, 40 and 42 form a second receiving circuit 43.

The output signal from the phase detector 28 is filtered by a low pass filter 44 and switched by switches 46 and 48 to either one of a pair of sample-and-hold circuits 50 or 52, respectively. The outputs of the sample-and-hold circuits 50 and 52 enter an output amplifier 54 (which is a differential amplifier in the circuit of FIG. 1). The output amplifier 54 provides a rate output signal. Timing generator 56 provides suitable control signals to enable the flow sensor 10 components to operate at the proper times.

During a cycle of operation, oscillator 12 is enabled to provide an electrical signal burst having a duration which is less than the ultrasonic propagation time between the pair of transducers 22 and 38. The signal burst, which occurs periodically and which is typically in the range of a few times per second to several hundred times per second, is isolated by the buffer 14 and enters frequency divider 16. The frequency divider reduces the signal frequency by a factor of 2 before it enters amplifier 18, which in turn powers transducer 22. The electrical signal burst from the buffer 14 also enters the inverter 30 which phase inverts it 180 degrees prior to inputting the signal to frequency divider 32. From there the signal proceeds to drive amplifier 34 for powering the second transducer 38. During the electrical signal burst, both transducers 22 and 38 are transmitting acoustic energy signals of the same frequency, which is ½ that of the oscillator 12 frequency, but the two signals are phase shifted by 90 degrees. At the same time, the switches 24 and 40 are open so that the attenuators 20 and 36, respectively, reduce the magnitude of the signals entering amplifiers 26 and 42 to levels approximating those encountered when transducers 22 and 38 are receiving acoustic energy signals from one another.

The output signals from the amplifiers 26 and 42 in the depiction of FIG. 1 are phase compared in the phase detector 28, which is typically an Exclusive-OR type detector. The output from the phase detector 28 then enters a low pass filter 44 to remove the high frequency burst carrier components therefrom while retaining a DC pulse having a magnitude corresponding to the phase shift between the two burst signals received by the phase detector 28. Switch 48 is enabled to connect the output signal from the low pass filter 44 to a sample-and-hold circuit 52 to retain the signal representative of the phase relationship (i e., phase difference) between the two signals present at the phase detector 28 inputs, which then enters the negative input of the output amplifier 54.

At the expected time of reception by transducers 22 and 38, of the acoustic energy signals, which now have experienced a differential transit time due to the flowing fluid, switches 24 and 40 are closed. This disables the attenuators 20 and 36 so that the unattenuated received signals enter the amplifiers 26 and 42 and are then passed to the phase detector 28. The output from the phase detector 28 enters the low pass filter 44, as before, but is routed by a switch 46, which is now enabled, to a sample-and-hold circuit 50. The circuit 50 retains this signal, which is representative of the phase relationship (i.e., phase difference) between the two signals present at the phase detector 28 inputs, which then enters the positive input of amplifier 54.

During transmission of the acoustic energy signals from each transducer 22 and 38, a portion of the electrical burst signal is simultaneously routed through the receiving circuits 27 and 43, phase detector 28, low pass filter 44, switch 48 and sample-and-hold circuit 52, to establish a reference voltage at the negative input of amplifier 54 for any differential phase shift caused by the components in the two signal paths associated with transducers 22 and 38. Put differently, this differential phase shift represents the difference between the transit time delays caused by the two signal paths that the electrical burst signals travel through in the flow sensor 10. This voltage thus forms a common mode voltage to both input signals to amplifier 54 which cancel each other. In this manner the phase shift that the flow sensor 10 is responsive to is only that produced by the transit time difference between the upstream and downstream acoustic signal propagations.

Phase detection for flow rate determination only occurs between the received acoustic energy signals. Frequency drifts associated with the oscillator 12 are experienced equally by both transducers. Accordingly, they cancel one another and the effects of variations of the acoustic path, which may occur, for example, if both transducers 22 and 38 do not transmit and receive at the same time, are minimized.

It should be noted that in both the transmitting and the receiving modes of operation, the same signal path through the same circuits 27 and 43 is used with the minor exceptions of the attenuators 20 and 36, and the switches 24 and 40. The corresponding resistive attenuators and electronic switches are, however, considered to be very stable and do not introduce significant phase shift error. Other means, such as logarithmic and gain controlled type amplifiers, may be used for amplifiers 26 and 42. These sorts of amplifiers will accept both the transmitted and received signals without distorting their phase relationship and will allow the attenuators 20 and 36, and the switches 24 and 40 to be omitted.

At a fluid flow rate of zero, both transducers 22 and 38 transmit acoustic signals together and, at a later time, receive acoustic signals together. Since their transmitted signals are 90 degrees out of phase, their received signals, having that same phase relationship, will also be 90 degrees out of phase. When the fluid flow rate is other than zero, the upstream and downstream transit times of the acoustic energy will be different and will change the phase difference between the input signals to phase detector 28 accordingly. Such a phase relationship is ideal for a simple phase detector such as an Exclusive-Or type detector and allows relatively simple low cost circuits to be used.

When the input signals to the Exclusive-Or phase detector 28 are 90 degrees out of phase, its output, after passing through filter 44 to remove carrier frequency components, is a DC level midway between its maximum and minimum. The phase detector 28 output is a minimum corresponding to its input signals being in phase and a maximum when they are 180 degrees out of phase. The transmission frequency of the acoustic energy is selected so that at the maximum fluid flow rate to be measured, the phase shift between the input signals to phase detector 28 does not vary by more than plus or minus 90 degrees The polarity of the output signal from phase detector 28 may be reversed, if desired, depending upon the initial phase relationship of the signals. The DC level at the middle of the phase detector's range therefore corresponds to a fluid flow rate of zero which will vary positive or negative depending upon the direction of the fluid flow, and will be offset from that midpoint in proportion to the rate of the fluid flow. If the flow sensor were to sense fluid flow rate in only one direction, the 90 degree phase shift between the transmitted signals could be reduced to increase the span range of flow rate measurement of phase detector 28 in the desired direction. However, for some applications and with other types of phase detection and digital computer processing, such phase shift may not be required at all and oscillator 12 may operate at the transmitted frequency. This would eliminate the frequency dividers 16 and 32 and inverter 30 circuits. Examples of such embodiments are depicted in FIGS. 3 and 4.

It is also possible to transmit a signal burst only from one transducer 22 and receive it only with the second transducer 38, and to then transmit only from transducer 38 and receive only with transducer 22, and likewise to continue to alternate the receiving and transmitting functions of the two transducers. In this instance, phase detection for both the transmitted and received signals is performed with reference to a stable oscillator 12 signal, for example. In any case, a feature of many embodiments of the present invention is the measurement, during a transmission mode of operation, of the phase response of substantially all the electronic circuits of the flow sensor 10 and the use of this phase response measurement to compensate the flow rate output signal accordingly. This aspect of the present invention provides these features and advantages even if it is used only in an occasional calibration mode of operation and can thus be broadly applied to ultrasonic transit time flow sensors.

Both receivers 27 and 43, phase detector 28, low pass filter 44, switch 48 and sample-and-hold 52 circuit can also be made to respond to the transducer signals produced by acoustic transmissions reflected from the receiving transducer back to the originating transducer. These signals arise from acoustic mismatches, such as a difference between the acoustic properties of the fluid and of a transducer. The magnitudes of these reflected signals are large enough to be significant when commonly used piezoelectric transducers have an acoustic impedance mismatch with the fluid with which the sensor is operating. This would occur for example, when an otherwise unloaded transducer made of a conventional PZT ceramic is attached to a thin piece of polysulfone plastic window that serves as a protective barrier to water or other fluid being sensed. In this way, a common mode correction signal can be generated which also includes the difference in transit time between the round trip propagation 153 times of each of the transducers 22 and 38, it being noted that the round-trip propagation times do not vary with fluid flow rate since the upstream phase shift is canceled by the downstream phase shift. However, while this mode of operation takes into account, for example, acoustic path and transducer coupling changes, the received round trip signals are of relatively low magnitude. With some transducer designs and flow sensor applications, the magnitude of the received round-trip signals may be too low to be usable.

The flow sensor 10 of the present invention may be designed to have very short duty cycles of operation and since relatively few components are required for its operation, it can operate from a very low power electrical power source. It is therefore particularly attractive for use with loop and battery powered applications.

Some of the applicable mechanical configurations of the present invention are schematically depicted in FIGS. 2a–2d. FIG. 2a shows a sensor probe 75 comprising both transducers 22 and 38. A reflector 74 completes the acoustic path 84, shown by a dotted line, through the fluid flowing between transducers 22 and 38. In FIG. 2b, the transducers 22 and 38 are mounted on the outside of a pipe 76 containing a flowing fluid. The internal wall of the pipe 76 acts as a reflector to complete the acoustic path 84 through the fluid between the transducers 22 and 38. In FIG. 2c, transducers 22 and 38 are mounted across a ell-shaped tube 78 facing each other. In this arrangement the acoustic path 84 is directly between the transducers 22 and 38.

A second set of transducers, 80,82 mounted orthogonally to the first pair 22 and 38, as shown in FIG. 2d, could also be used to derive 2-axes flow rate signals from which a resultant flow rate and direction can be derived. Such a device could beneficially use a single pair of transmitters and receivers and time share them among the corresponding pairs of transducers. Such an embodiment could be used to measure ocean currents, or to sense orthogonal flow components for flow sensor alignment in a pipe, or for a variety of other flow sensing applications.

Additional preferred embodiments of the invention are illustrated in FIGS. 3 and 4, which schematically depict flow sensors 10 with functional blocks similar in configuration and operation to that depicted in FIG. 1.

In the depiction of FIG. 3 an oscillator 12 produces bursts of continuous high frequency waves which are isolated by buffer 14, and enter a 2-pole switch 70 connected to the transducers 22 and 38. The transducers 22 and 38 are also connected to receiver A 27 and receiver B 43, respectively, which provide the two input signals to a phase detector 28 whose output passes through the low pass filter 44 to the sample and hold circuit 50, and finally to an output amplifier 54. The timing generator 56 controls the sequence and duration of operation of the various blocks.

During a cycle of operation, timing generator 56 enables oscillator 12 to produce a cyclic signal burst having a duration less than the ultrasonic propagation time between transducers 22 and 38. Receiver A 27 and receiver B 43 are placed into operation by the timing generator 56 to amplify the received signals from the transducers for use as input signals to the phase detector 28. The acoustic frequency carrier components in the phase detector 28 output are removed by the low pass filter 44. The DC magnitude of the phase detector output is retained by the sample-and-hold circuit 50 for final amplification by amplifier 54.

A drive switch 70 is selected to have a very low impedance so that when it is closed the transducers are essentially connected to each other to place their transmitted signals nearly in phase. The inputs of the receiver circuits are designed to accept the relatively high level input signals during signal transmission without damage or significant distortion or phase shift of the received signal. The receivers 27, 43 typically use switching and/or impedance mismatch techniques known in the current art to achieve this. As a result, the phase drift due to the electronic circuits is small enough for a practical and very low cost flow sensor of this type to be realized. However, if the apparatus is used over an extended temperature range or if the number cost of components is to be reduced, or if higher performance is desired, the drift contribution of the electronics can be reduced using the arrangement depicted in FIG. 4.

The circuit depicted in FIG. 4 differs from that of FIG. 3 in that a shorting switch 72 and a sample-and-hold circuit 52 are added, and the timing circuits 56 are modified to periodically close the switch 72 in order to apply the same signal to the two receivers and to activate the sample and hold circuit during that interval of receiver operation. The output from the sample and hold circuit is applied to the inverting input of amplifier 54 where it cancels the same common mode signal component appearing at the amplifier's non-inverting input. As a result, the phase drift due to all of the receiving and phase detecting circuits is minimized. At the time the switch 72 is closed, the signal applied to both receivers could be derived from an oscillator through an attenuator as in the circuit of FIG 1. Alternately, the apparatus could be used on a time shared basis with a signal periodically derived from received acoustic signals. With respect to the second example, if the switch 72 is open, the received, phase detected, and stored signal is at the positive input of amplifier 54. On the other hand, when the switch is closed the same signal appears at the amplifier's negative input, and these two modes of operation alternate to cancel the common mode error signal.

At zero flow rate, the transmitted signals are received at the same time and are therefore in phase. When an Exclusive-OR circuit is used for the phase detector 28, its average DC output signal is zero when its 2 input signals are in phase. When a phase difference between the input signals occurs, the output rises accordingly, irrespective of the polarity of the phase difference. This means that a flow sensor so equipped will not be able to determine flow direction, but will be able to measure only the magnitude of the flow rate. Such a flow sensor is therefore somewhat limited in its application. On the other hand, such a sensor may be used advantageously in situations in which it is desirable to install a flow sensor characterized by ease of installation and low costs and where a flow direction capability is not important. These situations would include for example, the metering of hydronic heating and cooling loops and water consumption.

When the input signals to an Exclusive-OR circuit are in phase or nearly in phase, the limitations of that circuit may result in unacceptable linearity errors in the relationship between the phase of its input signals and its output signal. This can be remedied, for example, by introducing a small fixed phase shift between the receivers so that at zero flow rate the Exclusive-OR circuit is already operating linearly and the direction of the fluid flow is always in the direction to increase that phase shift.

The concepts incorporated in FIGS. 3 and 4 are applicable to all of the transducer configurations shown in FIGS. 2a–2d.

When the present invention is installed in environments which encourage the accumulation of surface coatings, debris or biogrowths, electrolytic means may be used to clean or maintain clean the acoustically active surfaces. Such an environment could consist of a sea water environment, for example, where a positive potential is applied to the flow sensing or nearby surfaces which have been platinum plated so as to cause a corresponding electric current to flow through the water and generate chlorine gas at those active surfaces. Nearby insulated electrodes or conductive surfaces with a corresponding negative potential complete the current path. Low currents of several milliamperes and less have been found to be effective in maintaining the surfaces of small sensors having only a few square inches in surface area clean in such environments.

Those skilled in the art can now appreciate from the foregoing description that the broad teachings of the present invention can be implemented in a variety of forms. Therefore while this invention has been described in connection with particular examples thereof, the true scope or the invention should not be so limited since other modifications will become apparent to the skilled practitioner upon a study of the drawing, specifications and claims.

What is claimed is:

1. An apparatus for measuring a flow rate of a flowing fluid, the apparatus comprising:

a transmitter for transmitting bursts of electrical signals, each of the signals having a first duration;

a first transducer responsive to the bursts of electrical signals and located in acoustic contact with the flowing fluid for transmitting first acoustic energy signals in response thereto along a direction of flow of the flowing fluid, and for receiving at least a component of second acoustic energy signals responsive to the flow rate of the flowing fluid;

a second transducer responsive to the bursts of electrical signals and located in acoustic contact with the flowing fluid for transmitting the second acoustic energy signals in response thereto along a direction of flow of the flowing fluid, and for receiving at least a component of the first acoustic energy signals responsive to the flow rate of the flowing fluid;

a transit time of the received acoustic energy signals having a second duration;

at least one amplifying receiver for receiving the received acoustic energy signals from the first and second transducers;

a detector for determining a difference in a first round trip transit time between each of the first acoustic energy signals projected by the first transducer to the second transducer and reflected by the second transducer back to the first transducer, and a second round trip transit time between each of the second acoustic energy signals projected by the second transducer to the first transducer and reflected back by the first transducer to the second transducer, the detector adapted to generate output signals in accordance with a difference between the first and the second round trip transit times, the output signals having errors attributable to transit time delays caused by propagation of the bursts of electrical signals through the apparatus, as well as acoustic transit time errors, canceled therefrom; and a system responsive to the output signals for determining only the flow rate of the flowing fluid.

2. The apparatus of claim 1, further comprising a third and a fourth transducer which are mounted as a pair orthogonally to the first and second transducers; a switching system to time share the transmitting and the receiving electrical signals to provide a flow rate of the flowing fluid; and a processing system to extrapolate therefrom a resultant flow rate and flow direction of the flowing fluid.

3. The apparatus of claim 1, wherein an electrical current is provided through the fluid to cause electrolytic action at a surface of the apparatus in contact with the fluid.

4. A method for detecting a flow rate of a flowing fluid, the method comprising:

disposing a first transducer in acoustic contact with the flowing fluid;

disposing a second transducer in acoustic contact with the flowing fluid at a selected distance from the first transducer generating bursts of electrical signals from a signal source;

applying the bursts of electrical signals to the first transducer to cause the first transducer to generate first acoustic energy signals;

applying the bursts of electrical signals to the second transducer to cause the second transducer to generate second acoustic energy signals;

using the first transducer to receive the second acoustic energy signals which are responsive to the flow rate of the flowing fluid;

using the second transducer to receive the first acoustic energy signals which are responsive to the flow rate of the flowing fluid;

using the first transducer to receive the acoustic energy signals reflected from the second transducer back to the first transducer, thereby defining a first round trip transit time;

using the second transducer to receive the acoustic energy signals reflected from the first transducer back to the second transducer, thereby defining a second round trip transit time using at least one amplifier to receive the received acoustic energy signals from the first and second transducers;

using a detector to determine a difference between the first and second round trip transit times, and using a system responsive to a change in acoustic transit time between the transmitted and the received acoustic energy signals due to the flow rate of the flowing fluid to detect a difference in acoustic transit time between the acoustic energy signals transmitted by the first transducer and received by the second transducer, and between the acoustic energy signals transmitted from the second transducer and received by the first transducer, which the difference in the acoustic transit time is corrected for flow rate measurement errors by a signal from the detector; and from the differences in the acoustic transit times responsive to the flow rate, deriving the flow rate of the flowing fluid which has errors introduced by components of the apparatus and acoustic propagation errors removed therefrom.

5. An apparatus for measuring a flow rate of a fluid in acoustic contact with both a first and a second transducer, the first and second transducers spaced out along a flow direction, the apparatus comprising:

a transmitter for transmitting bursts of electrical signals, each of the signals having a first duration;

a drive switch having an open state and a closed state the drive switch controlled by a timing circuit to connect the transmitter to both the first and the second transducer when the drive switch is in the closed state and to disconnect the transmitter from both the first and the second transducers when the drive switch is in the open state;

the first transducer responsive to the bursts of electrical signals for transmitting a first acoustic energy signal along an axis parallel to a direction of flow of the flowing fluid, and for receiving at least a component of a second acoustic energy signal responsive to the flow rate of the flowing fluid;

the second transducer responsive to the bursts of electrical signals for transmitting the second acoustic energy signal and for receiving at least a component of the first acoustic energy signal responsive to the flow rate of the flowing fluid;

a phase detector responsive to the received components of the first and second acoustic energy signals, as well as to the transmitted bursts of the electrical signals; and a flow rate system responsive to the output signals from the phase detector for generating a flow rate output signal representative of only the flow rate of the flowing fluid.

6. The apparatus of claim 5 wherein the flow rate system comprises a low pass filter and at least one sample and hold circuit controlled by the timing circuit.

7. The apparatus of claim 5 wherein the flow rate system comprises at least two sample and hold circuits separately controlled by the timing circuit, the apparatus further comprising a shorting switch controlled by the tuning circuit to electrically short the first and the second transducers together.

8. The apparatus of claim 5 wherein the phase detector is adapted to determine a first phase difference in the bursts of electrical signals measured when the drive switch is in the closed state, the first phase difference caused only by a transit time delay of the bursts of the electrical signals as the bursts of electrical signals travel through components of the apparatus; and a second phase difference between the received acoustic energy signals measured when the drive switch is in the open state and representing the transit time delays caused by the components as well as transit time delays caused by the flowing fluid.

9. The apparatus of claim 5, further comprising a third and a fourth transducer which are mounted as a pair orthogonally to the first and second transducers; a switching system to time share the transmitting and the receiving electrical signals to provide a flow rate of the flowing fluid; and a processing system to extrapolate therefrom a resultant flow rate and flow direction of the flowing fluid.

10. The apparatus of claim 5, wherein an electrical current is provided through the fluid to cause electrolytic action at a surface of the apparatus in contact with the fluid.

11. A method for detecting a flow rate of a flowing fluid flowing in a flow direction, the method comprising the steps of:

disposing a first and a second transducer in acoustic contact with the flowing fluid, the first and the second transducers spaced apart along the flow direction;

generating bursts of electrical signals from a signal source;

closing a drive switch to simultaneously apply the bursts of electrical signals to the first and second transducers to cause the first and second transducers to generate respective first and second acoustic energy signals;

using the first transducer to receive the second acoustic energy signals which are responsive to the flow rate of the flowing fluid;

using the second transducer to receive the first acoustic energy signals which are responsive to the flow rate of the flowing fluid;

using respective first and second amplifiers to respectively receive as inputs the received acoustic energy signals from the first and second transducers; and detecting a flow-rate dependent phase difference between the outputs of the first and the second amplifiers.

12. The method of claim 11 further comprising subsequently executed step of:

sampling the phase difference with a sample and hold circuit having an output to an output amplifier, the output amplifier having a DC voltage output representative of the flow rate of the flowing fluid.

13. The method of claim 11 further comprising the steps of:

sampling the flow-dependent phase difference with a first sample and hold circuit controlled by the timing circuit, the first sample and hold circuit having an output to a first input terminal of a differential output amplifier; and generating a common mode error signal by:

opening the drive switch and connecting, by means of a shorting switch, the inputs of the first and second amplifiers, detecting a common mode phase difference between the outputs of the first and second amplifiers when their respective inputs are connected by the shorting switch;

sampling the common mode phase difference with a second sample and hold circuit controlled by the timing circuit, the second sample and hold circuit having an output to a second input terminal of the differential output amplifier; and subtracting, by means of the differential output amplifier, the common mode phase difference from the flow-dependent phase difference so as to obtain an output voltage representative of only the flow rate of the flowing fluid, using a system responsive to a change in acoustic transit time between the transmitted and the received acoustic energy signals due to the flow rate of the flowing fluid to detect a difference in acoustic transit time between the acoustic energy signals transmitted by the first transducer and received by the second transducer, and between the acoustic energy signals transmitted from the second transducer and received by the first transducer, which the difference in the acoustic transit time is corrected for flow rate measurement errors by a signal from the detector; and from the differences in the acoustic transit times responsive to the flow rate, deriving the flow rate of the flowing fluid which has errors introduced by components of the apparatus and acoustic propagation errors removed therefrom.

14. The method of claim 11 further comprising the steps of:

using the first transducer to receive the acoustic energy signals reflected from the second transducer back to the first transducer, thereby defining a first round trip transit time;

using the second transducer to receive the acoustic energy signals reflected from the first transducer back to the second transducer, thereby defining a second round trip transit time; and using the phase detector to determine a difference between the first and second round trip transit times.

* * * * *